APPARATUS FOR TESTING TELEPHONE SWITCHING SYSTEMS

Filed Aug. 30, 1962 9 Sheets-Sheet 1

INVENTOR
J. G. EDWARDS
BY [signature]
ATTORNEY

APPARATUS FOR TESTING TELEPHONE SWITCHING SYSTEMS

INVENTOR
J. G. EDWARDS
By [signature]
ATTORNEY

APPARATUS FOR TESTING TELEPHONE SWITCHING SYSTEMS

Filed Aug. 30, 1962 9 Sheets-Sheet 3

INVENTOR
J. G. EDWARDS
By [signature]
ATTORNEY

INVENTOR
J. G. EDWARDS
BY
ATTORNEY

Aug. 9, 1966 J. G. EDWARDS 3,265,820

APPARATUS FOR TESTING TELEPHONE SWITCHING SYSTEMS

Filed Aug. 30, 1962 9 Sheets-Sheet 5

INVENTOR
J. G. EDWARDS
BY [signature]
ATTORNEY

APPARATUS FOR TESTING TELEPHONE SWITCHING SYSTEMS

Filed Aug. 30, 1962

INVENTOR
J. G. EDWARDS
By [signature]
ATTORNEY

INVENTOR
J. G. EDWARDS
BY [signature]
ATTORNEY

APPARATUS FOR TESTING TELEPHONE SWITCHING SYSTEMS

Filed Aug. 30, 1962 9 Sheets-Sheet 8

INVENTOR
J. G. EDWARDS
By [signature]
ATTORNEY

APPARATUS FOR TESTING TELEPHONE SWITCHING SYSTEMS

Filed Aug. 30, 1962 9 Sheets-Sheet 9

INVENTOR
J. G. EDWARDS
By
ATTORNEY 3,265,820

APPARATUS FOR TESTING TELEPHONE SWITCHING SYSTEMS

Joseph G. Edwards, Greenlawn, N.Y., assignor to Western Electric Company, Incorporated, New York, N.Y., a corporation of New York Filed Aug. 30, 1962, Ser. No. 220,434
14 Claims. (Cl. 179—175.21)

This invention relates to telephone switching systems and particularly to apparatus for automatically testing step-by-step systems.

Basically, the step-by-step system comprises a series of repetitive electromechanical switching units which direct a telephone call to a subscriber's line with dial pulses. The switches are mechanically similar and several operate in sequence to establish a talking path through the telephone office, each switch in turn providing part of the connection. Because the operation of any switching unit is independent of any other, except for electrical interconnection, it has been the practice heretofore to test a step-by-step system on a switch-by-switch basis.

More specificially, prior to this invention, the cabling and wiring between switches was verified manually and the switching system checked switch-by-switch for proper mechanical adjustment and electrical operation with interconnecting units. This type of testing program while considerably refined in technique and scope over the years, still fails to simulate the actual operating conditions encountered in dialing a number.

Accordingly, an object of this invention is to automatically test telephone switching systems with new and improved apparatus.

A more specific object of this invention is to simulate operational conditions on step-by-step telephone switching systems with automatic test apparatus of unique construction.

Another object of this invention is to provide apparatus for transmitting a series of pulses on several office lines simultaneously to terminations at the test apparatus thereby simulating the dialing of a selected telephone designation.

A further object of this invention is to provide step-by-step test apparatus which is small, portable, easy to operate and maintain, and has low power requirements.

In general, the test apparatus embodied herein provides means for automatically testing telephone switching equipment, particularly of the step-by-step type, by pulsing one or more different sets of digits on one or more lines simultaneously. While the apparatus is discussed primarily with respect to step-by-step systems, it may be used with other telephone systems, such as the cross-bar or panel type systems. The apparatus utilizes a standard pulsing arrangement to apply pulses to a number of outgoing lines, through the office equipment and terminating lines, to terminations at the test apparatus. As the outgoing lines are being pulsed, a counting device is actuated to limit the pulses to a predetermined count representing a particular subscriber's designation. The apparatus checks preset ringing conditions, answers the call and observes that the office equipment reverses the talking path back to the calling line as a correct response to the answer signal. Various subscriber line and office cabling conditions can be simulated as test conditions. If a trouble condition is encountered during the simulated call, the test apparatus blocks at that point so that the trouble can be located and corrected.

An extremely rapid test of a telephone office can be performed by setting a busy condition on a switch immediately after a successful test call has been made so that when the test apparatus recycles a different path must be found to complete the call. This process would be repeated until all paths available to the lines under test have been selected. The test apparatus would then be moved to new originating and terminating lines.

Considerably less effort is required in testing step-by-step equipment with the apparatus of this invention; and since the apparatus is light, portable and rugged, it can be moved about readily for test assignments. These features are quite desirable since step-by-step offices are often small in size and built-in test equipment cannot be jusified on an economic basis. The subject test apparatus is also uniquely suited for testing PBX or private branch exchange switching equipment on the subscriber's premises and installation testing on new central office equipment in addition to normal maintenance testing on existing central office equipment.

A more complete understanding of the previously mentioned and additional objects and features of the invention may be obtained from the following detailed description of one preferred embodiment thereof when read in conjunction with the accompanying drawings, wherein:

FIGS. 8, 9, 10, 11 and 12 show in diagrammatic form the detail circuitry which comprises the invention wherein;

FIG. 8 shows mainly an originating line circuit and a corresponding sleeve control circuit;

FIG. 9 shows the pulse counting and digit selector circuits with interconnected control circuits;

FIG. 10 shows a detailed circuit of the pulse generator;

FIG. 11 shows primarily a terminating line circuit; and,

FIG. 12 shows a terminating line sleeve control circuit and various associated circuitry.

With reference to the drawings, it is to be understood that those portions of the circuit representing conventional and commercially available equipment known in the art will not be described in detail. For the sake of clarity, detached contacts are used to represent relay contacts wherever practical, a cross indicating a make contact, and a bar indicating a break when the relay is operated. However, where the contacts are adjacent to the relays in the detailed circuit drawings, the contacts are shown schematically as switch contacts. The test apparatus will first be described generally with reference to FIG. 1, which depicts the more important interacting circuits.

Figure 1:
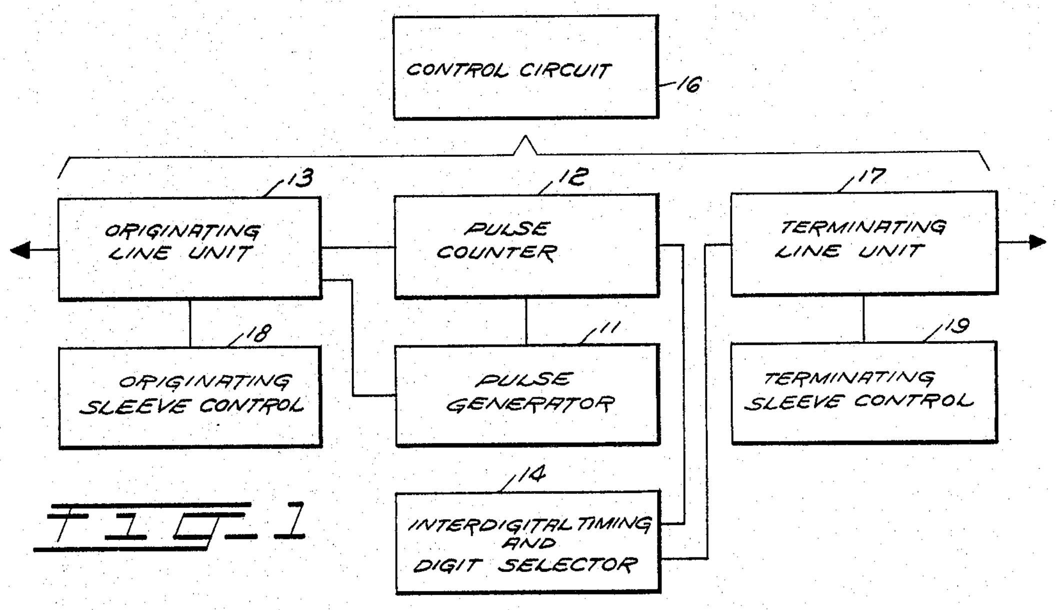
FIG. 1 is a block diagram illustrating the connection and association of the more important interacting circuits.

As illustrated in FIG. 1, the apparatus includes a pulse generator 11, such as a multivibrator, connected both to a counter 12, which in one preferred embodiment of the invention is a digital counting tube, and to an originating line unit 13 which, in turn, is connectable to a plurality of outgoing subscriber lines, indicated generally by the arrowed output. The operation of the counter 12 is responsive to a digital control setting which corresponds to a particular subscriber designation as initially set on a digit selector unit 14. The precise number of selected digits are simultaneously impressed on each of the outgoing subscriber circuits through the operation of a control circuit 16 which limits the outgoing pulses in accordance with the predetermined digit control setting. Several timing intervals, such as those based on interdigital or recycle timing are provided to allow for the various operations which are to be performed by the switching equipment within a prescribed period of time. The outgoing pulses which are set by the interdigital timing and digit selector 14 terminate in the apparatus through a terminating line unit 17 to indicate completion of the call.

Other unique aspects of the subject apparatus for making automatic calls through tests on local switching systems include means for presetting the test conditions for connection to flat rate, message rate, party or coin lines while originating and terminating simultaneous test calls over a plurality of test lines.

With the system illustrated, a maximum of eleven digits can be outpulsed on each line at a rate of ten p.p.s. or twenty p.p.s. It is entirely possible, however, utilizing the principles of this invention, to adapt the subject apparatus to outpulse any number of digits at varying pulse speeds.

Automatic or manual recycling is also provided, the duration of each cycle being approximately 25 seconds. Marginal tests made possible by the apparatus of the present invention during each cycle include percent break, interdigital timing, loop and leak measurements and the amplitude and polarity of the ringing voltage.

Failure of battery, loss of sleeve or ground, or a reversal of the ring will cause the originating line sleeve control 18 to block and hold up the switch train. Failure to properly terminate the test call in the apparatus causes the terminating line unit 17 to automatically lock the apparatus and hold up the switch train. The terminating line sleeve control 19 operates when all of the calling lines have been terminated, i.e., when ground has been received on all the terminating line sleeves.

If desired, a line finder progression circuit may be incorporated with the test apparatus to originate calls progressively from each line finder within a group. Provision can also be made to bypass the circuit in offices where an allotter circuit is supplied to do this automatically. The apparatus may also be advantageously used for testing telephone switching equipment in small central offices having a limited number of selector frames connected to a plurality of subscriber lines. In such instances, the apparatus is provided with means for shifting counting pulses on lines not connected to a separate selector frame one pulse behind the other outgoing pulses so that each call is directed to a particular selector and no two calls hunt on the same selector. Normal power requirements for the test apparatus are 110 volts A.C. at a maximum current drain of 10 milliamperes and negative 48 volts at a maximum current drain of 0.9 ampere.

A more detailed description of the various circuits briefly described in FIG. 1 will now be given.

Figure 2:
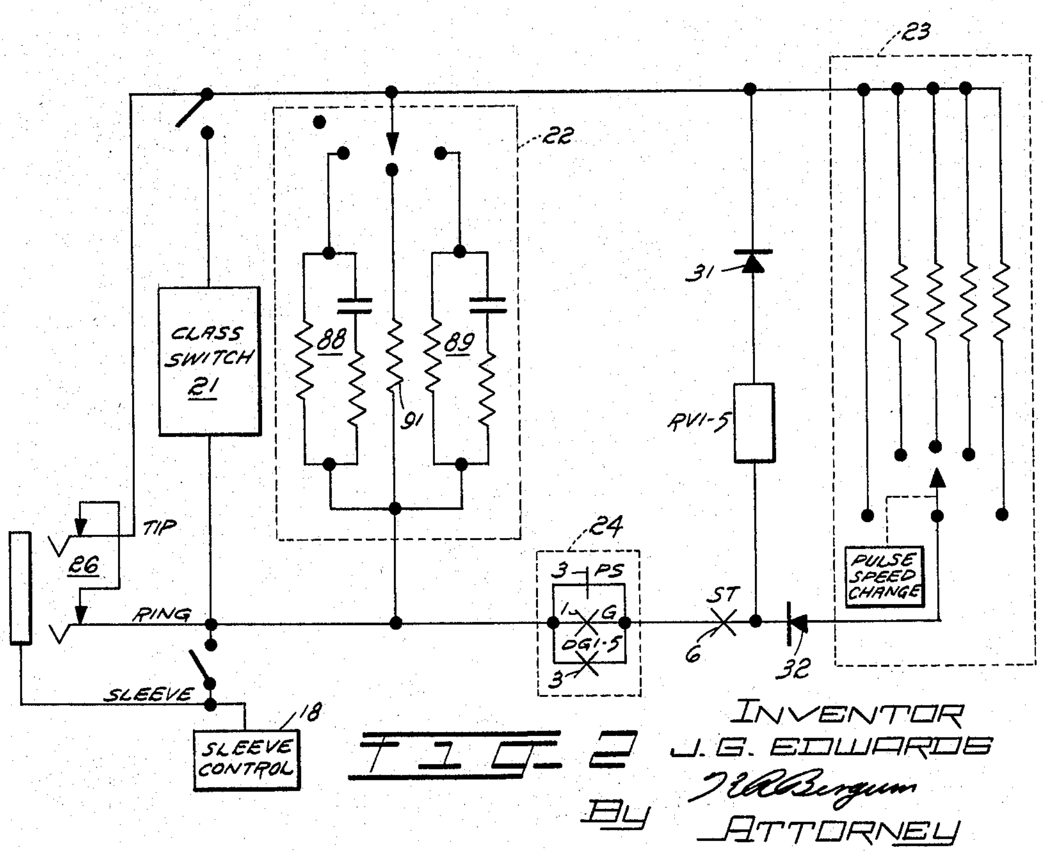
FIG. 2 shows an originating line circuit.

The originating line unit 13 illustrated in FIG. 2, connects the test apparatus to the Central Office switching equipment (not shown). One standard-type jack 26 is provided per originating line, and connection is made thereto by plugging into the jack a cord fixture (not shown) which is equipped at the other end with a suitable connecting fixture. This latter end is connected to the tip, ring and sleeve of the selected office line. A connection to the jack 26 removes the short across the tip-ring circuit and completes the test circuit through the class switch 21, leak switch 22, and loop switch 23 which are provided to determine the type of test call and the conditions of the test.

One class switch 21 is provided per test line, each switch having five positions with each position corresponding to the class or service condition to be simulated on the line under test. For a normal call situation, the switch 21 is shorted across jack 26 as depicted in FIG. 2, so that the call proceeds directly over the tip-ring circuit. The various service conditions such as bypass, coin, regular, hold and monitor are shown in the detailed circuit diagram of FIG. 8.

Figure 8:
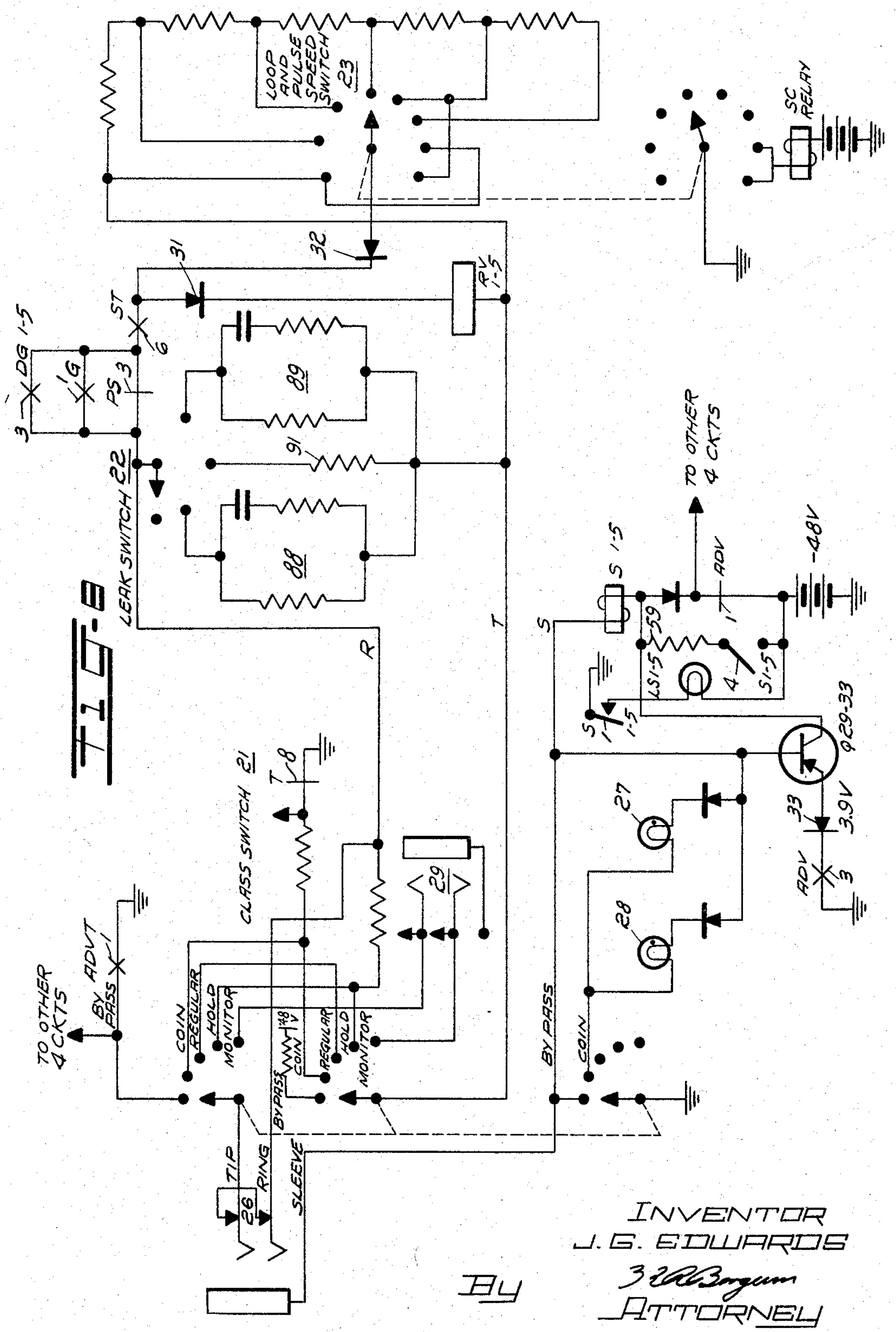

With particular reference to FIG. 8, when testing with less than five lines, the lines not in use are set to bypass with the ADVT relay contacts 1 simulating battery reversal on unused lines during the RV relay operation. The coin setting is used for coin lines with the coin collect and coin return lamps 27 and 28 indicating when coin battery is applied to the tip and ring in simplex signalling.

The hold setting merely places a short across the tip-ring circuit so that a trouble condition can be traced. The monitor setting is used in conjunction with a jack 29 either to send out a call without setting the digit or dial switches 38 or to verify the terminating point of a test call.

One leak switch 22, shown in FIGS. 2 and 8, is provided for the five test lines. The switch 22 is used to control the leak condition applied across the originating lines by connecting a 1600 ohm resistor 91 or standard resistor-capacitor combination 88 or 89 between the tip and ring lines or by setting the switch to a no leak condition.

One loop and pulse speed switch 23 is provided for the five illustrative test lines. The positions of the switch are used to control both the loop resistance of the originating lines and the pulsing speed of the output pulses. In one embodiment, the loop conditions are no loop, 600 ohms, 800 ohms, 1200 ohms, 1400 ohms and 2000 ohms. Pulse speed at no loop or 1400 ohms may be set to 10 p.p.s. or 20 p.p.s. by actuating an SC relay winding which includes SC contacts 1 in the pulse generator circuit of FIG. 10. The higher pulse speed, 20 p.p.s., and the 1600 ohm leak condition are primarily designed for crossbar applications.

Since the loop and leak switches 23 and 22 check marginal conditions, the test apparatus is usually operated first with a no-loop, no-leak condition, then a no-loop with a leak condition and finally a no-leak with a loop condition. This sequence permits the overall test to be carried out without interference from the marginal settings and keeps the marginal conditions from interfering with each other.

Bridged across the dialing loops are high resistance diodes 31 and RV1–5 relays, which are normally unaffected by the current flowing through switch 23 which controls the loop resistance and pulse speed. However, when dialing and ringing is completed on the terminating end, as will be described later in greater detail, battery is returned to the originating line through the RV1–5 relays to indicate correct operation of the switching equipment. Diodes 32 prevent the current from reversing direction and passing through the switch, particularly when the switch is in a no-loop or shorted condition. Reverses in the tip and ring of any test line while dialing will also operate the corresponding RV relay to open the start lead of the apparatus and thereby block and hold the switch train.

The apparatus is started by operation of the ST relay contacts 6 in the ring circuit of the operating lines. The block diagram 24, of FIG. 2, which is shown in greater detail in FIGS. 4 and 8, supplies dialing pulses to the outgoing lines from the pulse generator 11, which includes a PS relay, through a pair of PS break contacts 3 located in the ring circuit of the outgoing lines. The control circuit gate 36, (FIG. 4) together with an associated relay G (FIG. 9), activate G relay contacts 1, connected in shunt with the PS contact 3. G contacts 1 operate to short out the continuously running PS relay to control the interval between pulses. The counter circuit gate 37, together with an associated relay DG and contacts 3 thereof, are operated by the pulse counter 12 to stop the pulse generator 11 when the required number of pulses have been sent. The rest of the circuit of FIG. 4 functions as previously described in FIG. 1.

Figure 3:
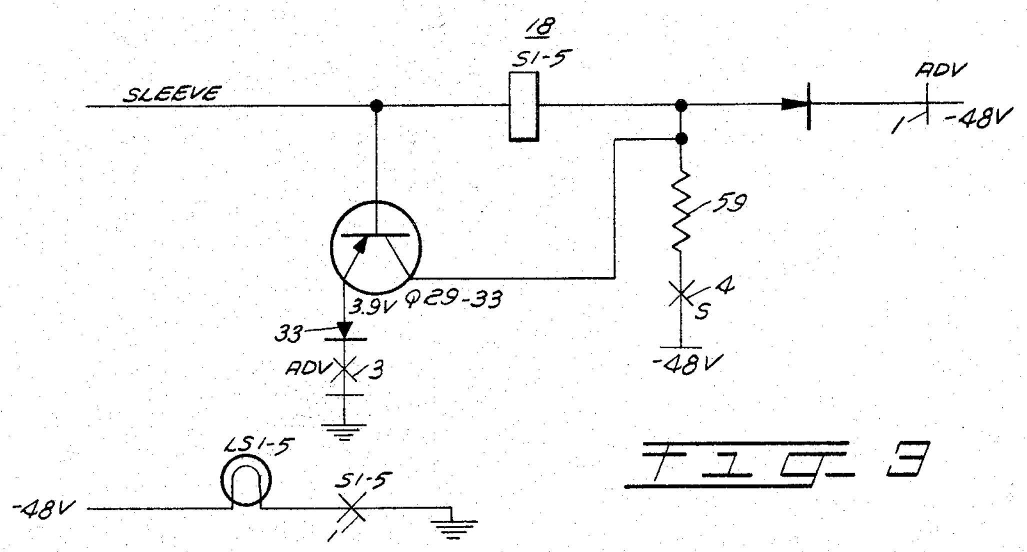
FIG. 3 shows a sleeve control circuit for an originating line.

The originating sleeve control unit 18 of FIG. 1 is associated with transistors Q29–33 of FIG. 8, and is best seen in simplified schematic form in FIG. 3. This unit functions when ground is applied to the sleeve of the originating line, that is, when dial tone is received on each line. Relays S1–5 operate with battery supplied through normal break contacts 1 of an ADV relay. Relays S1–5 complete a ground operate path lighting LS1–5 lamps through S1–5 contacts 1 when the ADV relay operates and lock operated to battery through S contacts 4.

When the sleeve is lost on an originating line, the current necessary to hold the switch equipment is supplied through the particular one of transistors Q29–33, associated with the line in question. This transistor also shunts the associated S1–5 relay turning it off and extinguishing the corresponding LS lamp. The apparatus will block and hold the connections until the trouble is located through the new ground operate path of the transistor (Q29–33), diode 33 and ADV contact 3. The Zener diode 33 in series with the emitter 34 of each sleeve transistor biases the circuit at 3.9 v. in one embodiment to prevent false release of the associated S relay due to voltage differentials in the office.

Heretofore when supervision was lost on the sleeve, the entire connection was lost and the trouble could not be traced. The subject apparatus, however, monitors the sleeve until ground is lost and then takes over and holds up the connections before the equipment prematurely terminates testing. It is also possible to monitor battery as well as ground on the sleeve by merely reversing polarity and to monitor different battery conditions by changing the diode 33 in the substitute ground operate path. The sleeve control circuit embodied herein and adaptations thereof are not restricted to telephone systems but may be employed in numerous embodiments as a "fail-safe" feature which holds up prior circuit connections upon occurrence of a fault until the trouble condition can be corrected.

The pulse generator 11, for supplying dialing pulses, may be of any type capable of supplying an intermittent input signal simulating a telephone pulse sequence for dialing operations. In the preferred embodiment of this invention, a transistorized, free-running multivibrator has been selected as the pulsing element. The operation of the pulse generator 11, FIG. 10 of the drawings, will be described more fully hereinafter.

Figure 4:
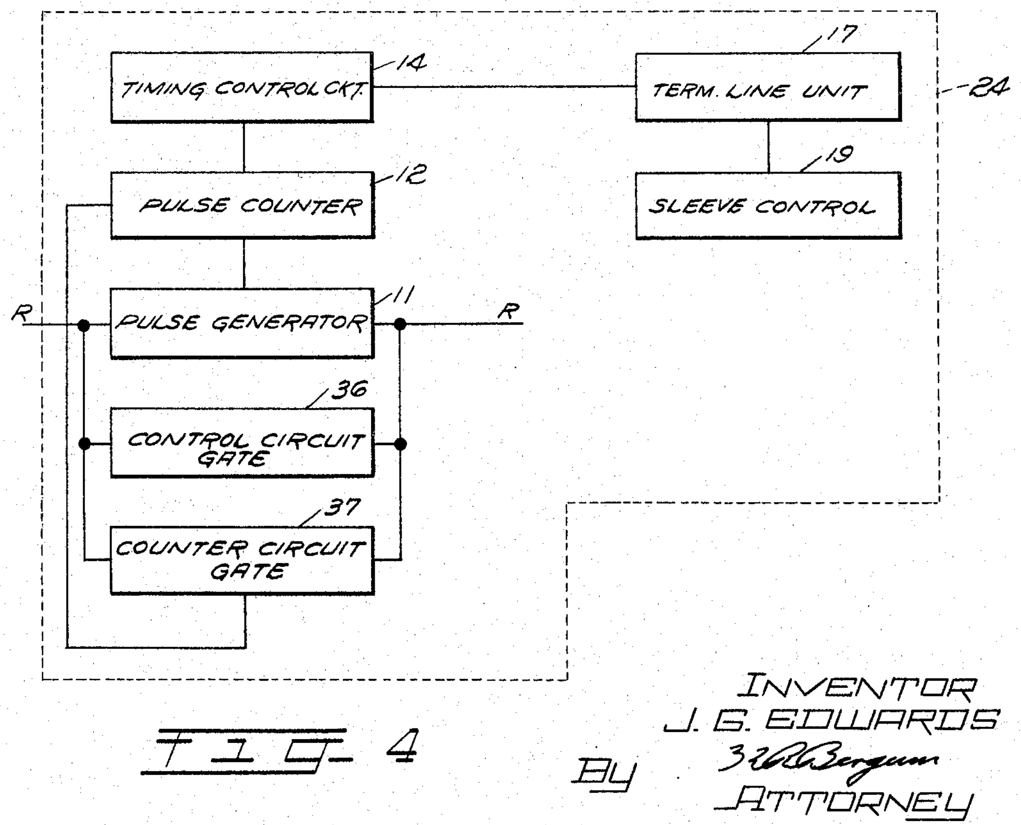
FIG. 4 is a block diagram showing the pulsing circuit of FIG. 2 in greater detail.
Figure 5:
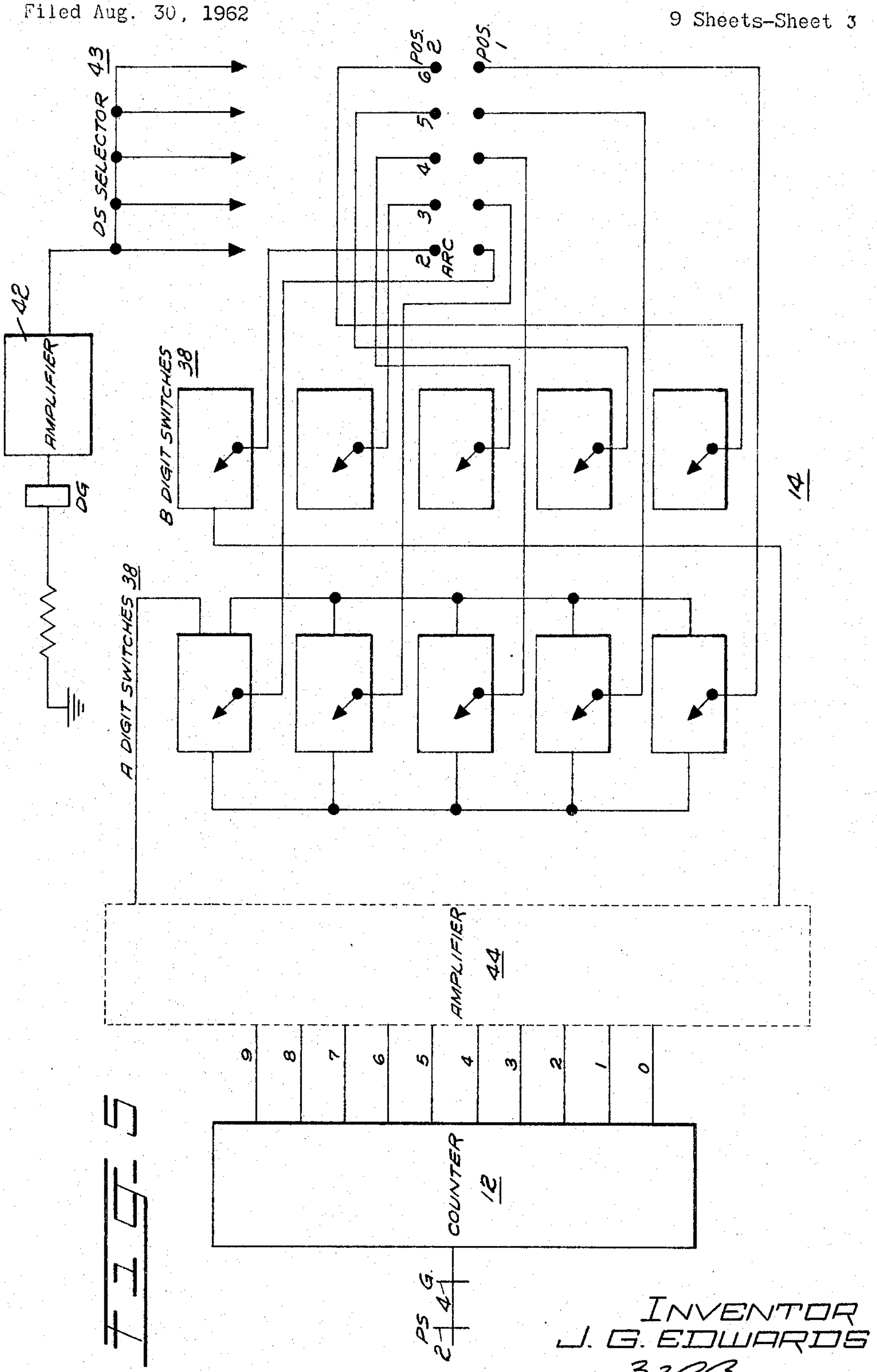
FIG. 5 shows the pulse counting and digit selector circuit.

The basic operation of the pulse counter 12 and the digit selector 14, shown in block diagram form in FIGS. 1 and 4, is best described with relation to FIG. 5. A pulse counter 12, such as a digital counting tube, supplies predetermined pulses corresponding to a subscriber's number over outputs 0–9 to an amplifier 44. The calling digits are directed to the terminating test lines by setting the office code and line number of the digit switches 38. There are eleven digit switches per test line, each switch having eleven positions, one off position and ten positions designated 1 through 0 corresponding to the numbers found on the telephone dial. For purposes of illustration only 2 of the 11 switches per line, i.e., the A and B digit switches, are depicted in FIG. 5.

When the test apparatus is operating with the G relay contacts 1 and 4 normally closed, the PS relay supplies pulses to the ring lead of the originating line (FIG. 2) and sends pulses to the counter through contacts 2. When a preset pulse is received, the particular counter output functions, completing a path through amplifier 44, the digit switch 38, the corresponding setting of the rotary DS selector switch 43 and amplifier 42 to operate the DG relay, that is, the counter circuit gate 37 of FIG. 4. The DG relay locks operated to ground and back biases the amplifier 42 to switch it off, thereby limiting the pulses to a predetermined number by shunting the PS relay contacts 3 (FIG. 8) on the originating line through DG contacts 3.

Figure 6:
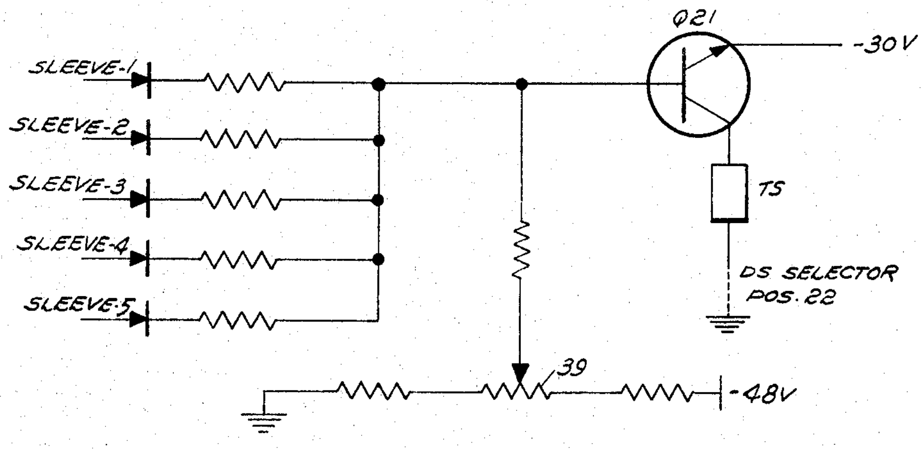
FIG. 6 shows a sleeve control circuit for the terminating lines.

FIG. 6 depicts in simplified schematic form the terminating sleeve control circuit 19. Ground is received on the terminating line sleeves 1–5 through potentiometer 39 as the calling lines terminate. When all the terminating line sleeves are grounded, transistor Q21 turns on, completing the operating path of a TS relay. Ground is supplied to the TS relay through position 22 of the DS selector 43. Although it is possible to conceive of other circuit components to perform the particular circuit switching of the DS selector, a standard rotary selector switch having 22 positions is used in the detailed illustrative embodiment depicted in FIG. 9. This provides additional positions beyond those needed in the present case in order to accommodate any future modifications and eliminate the need for a custom-made switch. Potentiometer 39 is adjustable so that the bias voltage of transistor Q21 can be set to a value requiring all five terminating line sleeves to be grounded before the transistor conducts.

Figure 7:
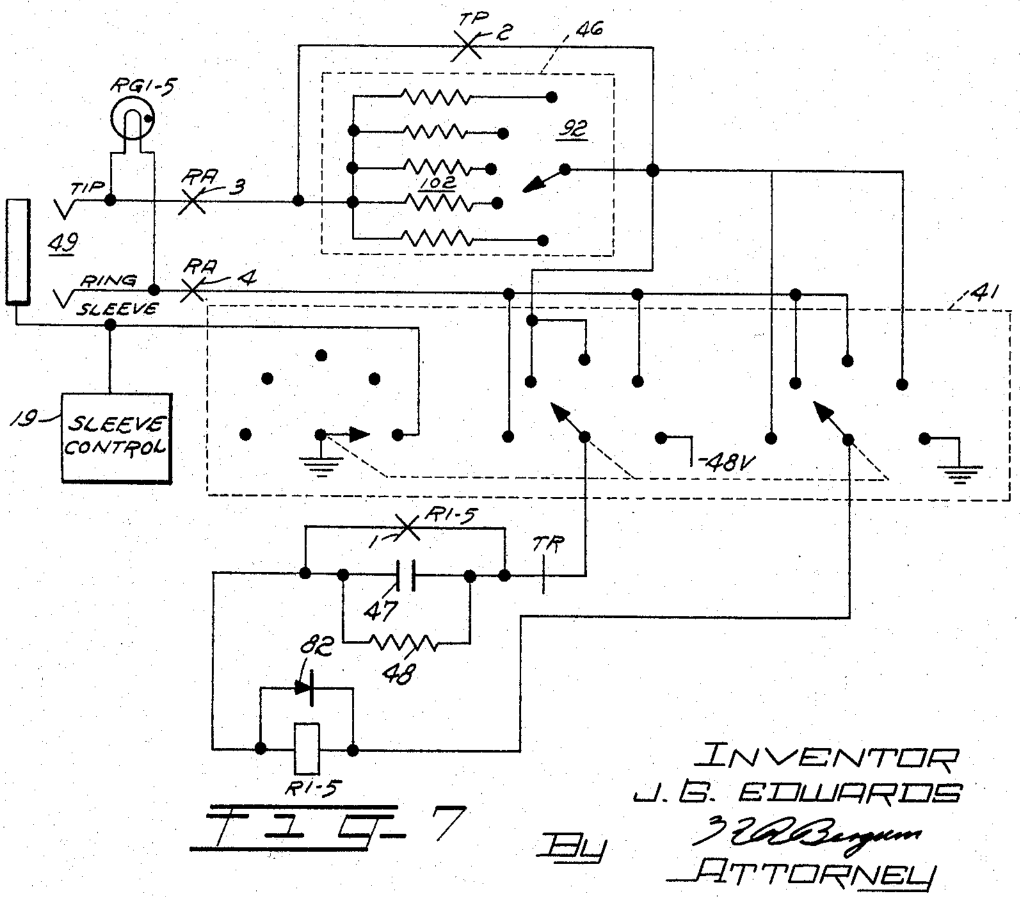
FIG. 7 shows a typical terminating line circuit.

The TS relay operates the RA relay closing contacts 3 and 4 in the terminating line unit 17 depicted in simplified schematic form in FIG. 7. The RA relay also completes the terminating tip and ring circuit through the ringing switches 41 and the trip switches 46 of the terminating line circuit 17. Coded ringing can then be checked visually with RG1–5 lamps. The trip switches 46 are set for a designated pretrip condition but are shorted by make contacts 2 of the TP relay which depend upon the operation of the relay associated with the control circuit 16. The ringing current from the switch equipment operates relays R1–5 which, in turn, short the marginal ringing network of capacitor 47 and resistor 48 through contacts 1, and hold to the trip battery of equipment under test.

The terminating line unit 17 of FIG. 1, which is depicted in greater detail in FIG. 7, operates in the following manner when the calling lines are terminated through jack 49 and ground is supplied on the terminating line sleeves. Firstly, the RA relay (FIG. 11) operates, lighting the TL terminating line sleeve check lamp for a visual check of the terminating sleeves and closing the terminating tip and ring through the ringing switches 41 and trip switches 46 to the R1–5 relays. The trip switches are set to the proper position for the pretrip requirement and the R1–5 relays are marginal to insure operation on the proper ringing current only. The TR timer, which starts when all the R relays are operated, operates the TR relay contacts 2 at the end of the timing period provided that all R relays have remained operated during the silent period of the equipment ringing cycle.

The variable pretrip switch 46 of FIG. 7 is provided on each of the test lines. The five switch positions 92 used to establish the pretrip conditions on the line are designated in ohms: 1400, 2200, 2500, 3000 and 3200, in one illustrative embodiment. In any one position, the same pretrip condition of resistance is simulated on all five lines.

The ringing switch 41 of FIG. 7 is set to verify the ringing condition on the terminating line. One switch is provided per test line and provision is made to check negative ringing on tip, positive ringing on tip, negative ringing on ring, positive ringing on ring and busy on non-terminated lines.

*Operation of test apparatus*

Figure 9:
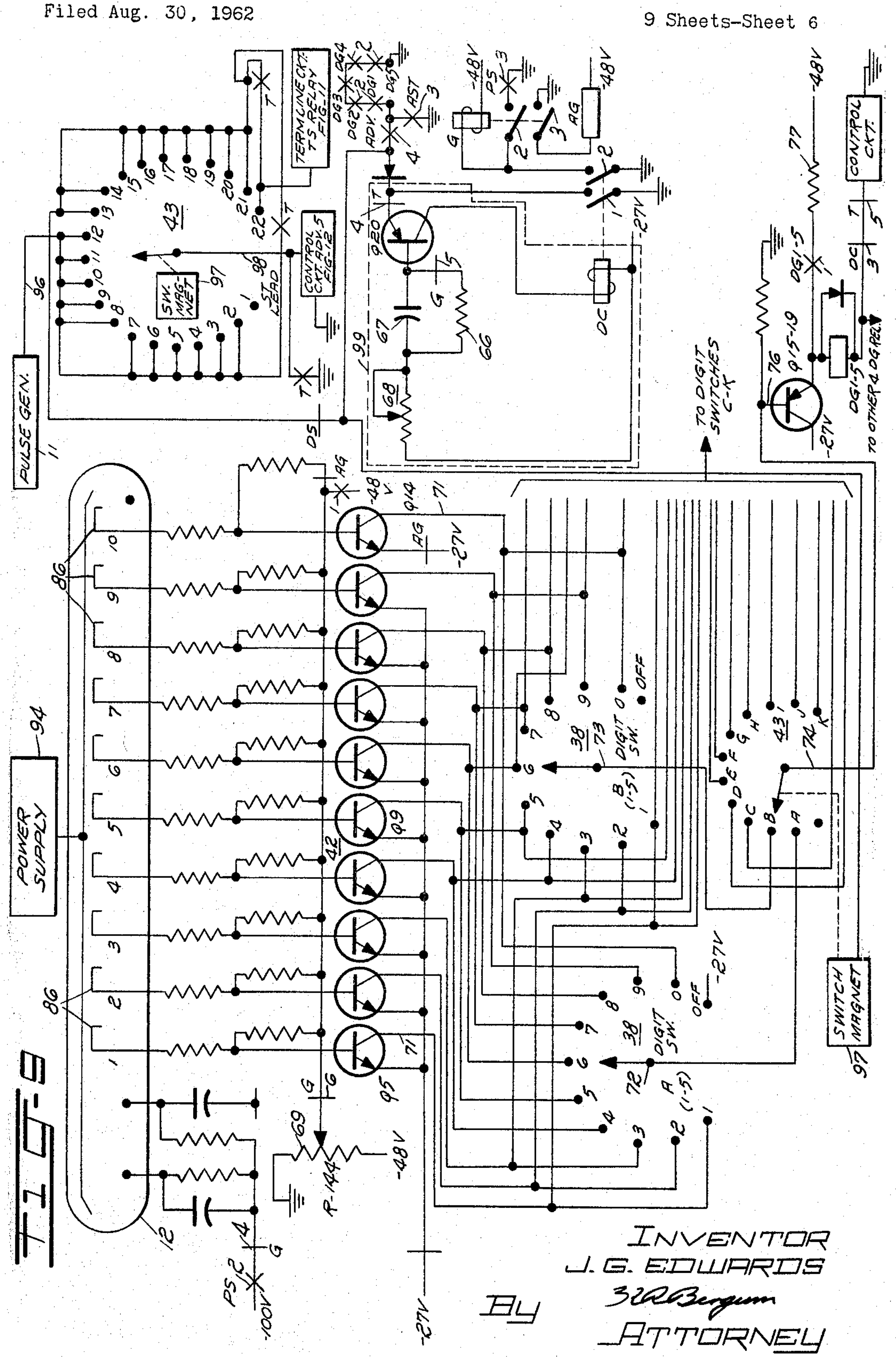

The novel apparatus as thus far subdivided in simplified form to facilitate understanding, will now be described in detail with reference to one illustrative mode of operation for testing a plurality of office lines by simulating the dialing of a selected telephone designation. Discussion will also be directed to various line and office conditions checked by preset controls which permit a complete test of the overall system. Before commencing a test, the class switch 21, the leak switch 22, and the loop and pulse speed switch 23 (FIGS. 2 and 8), and the ringing switch 41 and the pretrip switch 46 (FIGS. 7 and 11), are set for the desired office condition. The subscriber designations are set on the digit switches 38 (FIGS. 5 and 9). The operation of the test apparatus will be described in the following pages with respect to the more detailed circuit drawings, namely, FIGS. 8, 9, 10, 11 and 12. As an aid, however, reference will be made to both the simplified and detail drawings in describing the operation of components and circuitry wherever possible.

Figure 12:
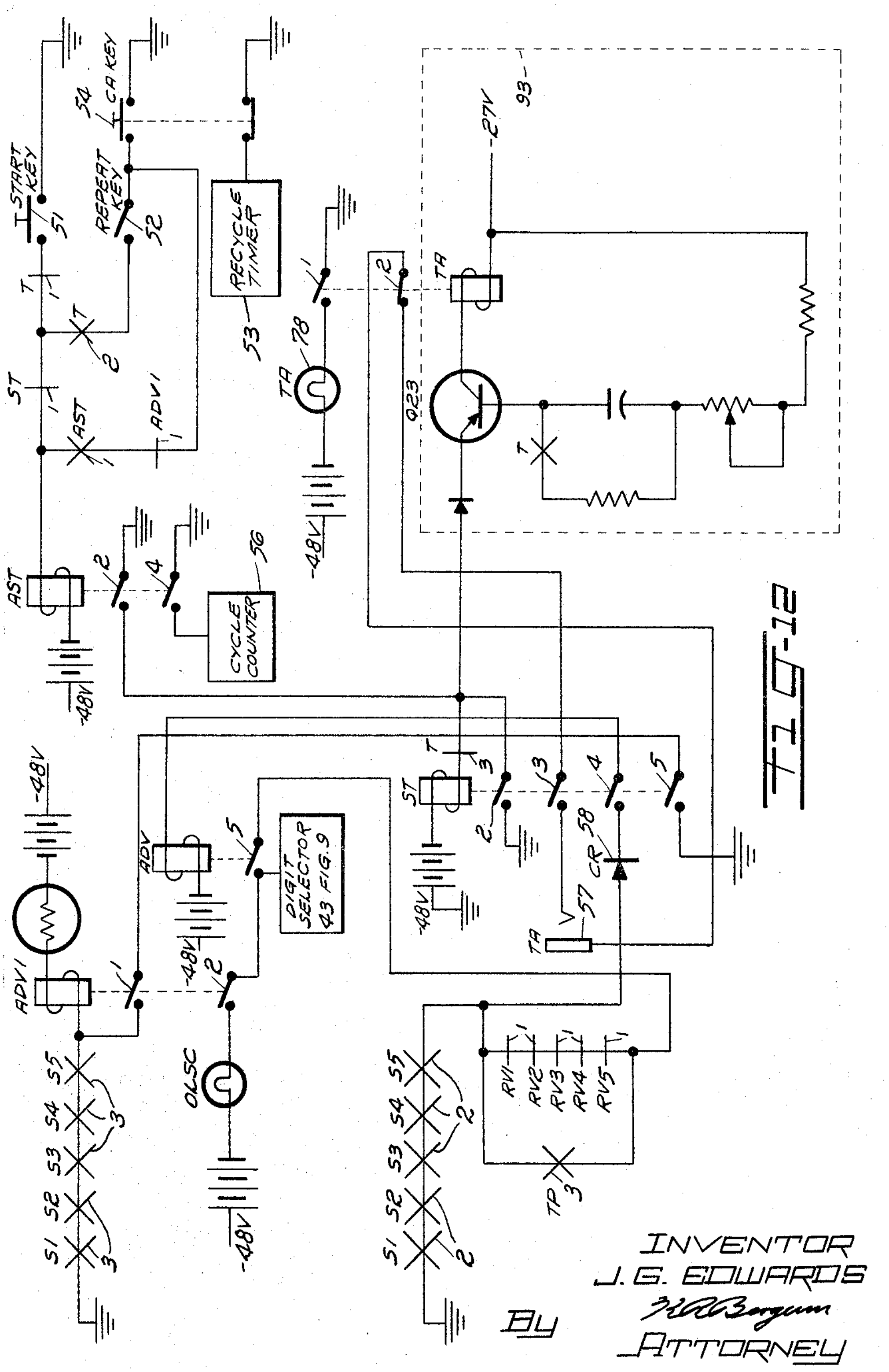

The test is started by operating the non-locking start key 51 associated with the TA relay of FIG. 12 to supply ground through normally made contacts 1 of the T and ST relays to operate the AST relay. The line seizure switching sequence which occurs prior to the actual test operation begins and is discussed with particularly hereinafter. This sequence simulates a subscriber picking up a telephone and waiting for dial tone, i.e., ground on the sleeve connection.

Figure 11:
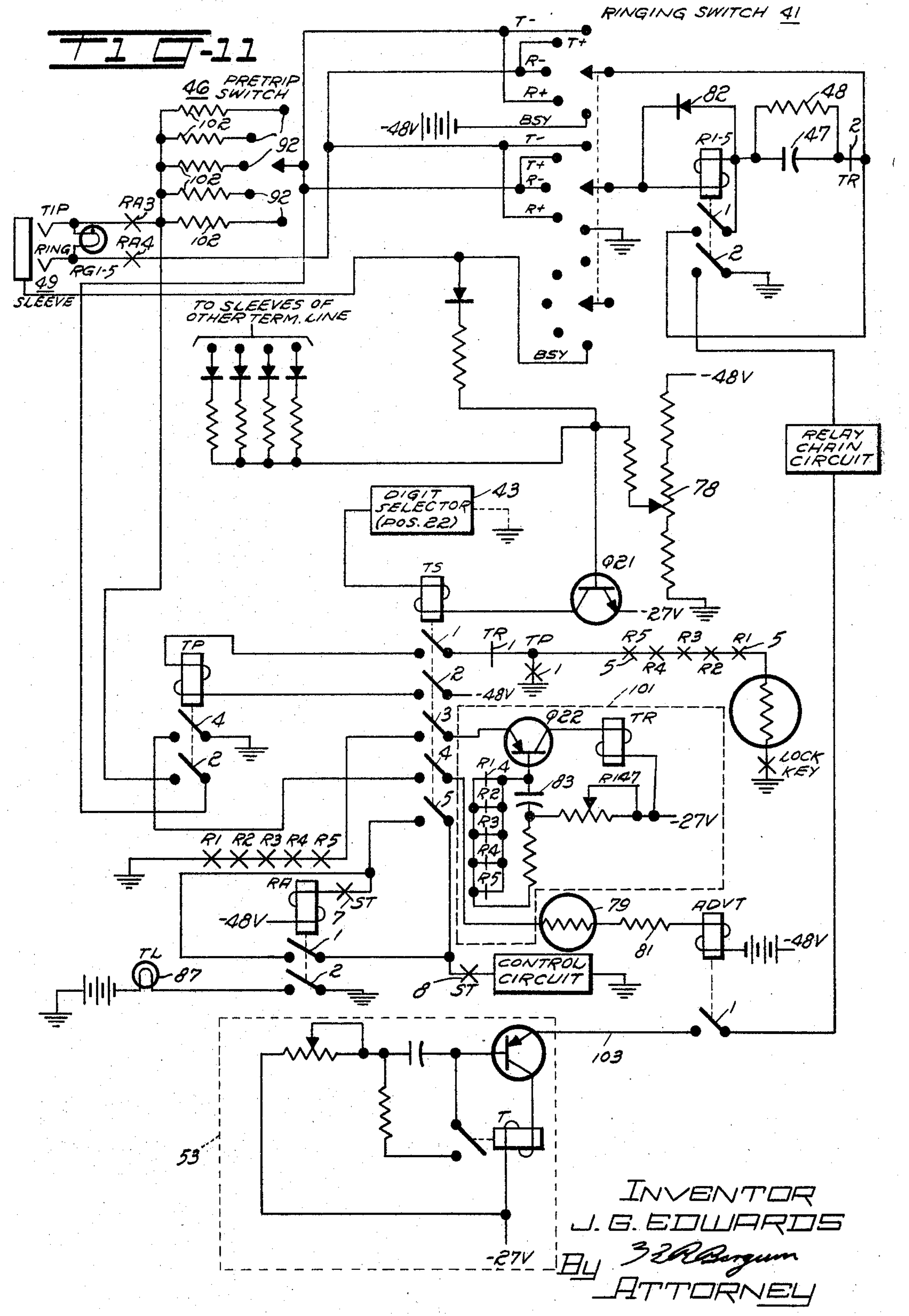

If the apparatus is at the end of a cycle and set for automatic recycling by locking the repeat key 52, the T relay of the recycle timer 53, FIG. 11, will operate to bypass the start key 51, FIG. 12, and close the operate path for the AST relay. The path is completed through make contacts 2 of the T relay, the repeat key 52 and the CA key 54 normal to operate the AST relay.

The AST relay (FIG. 12) locks operated to ground through its own make contact 1 (detached), normal break contacts 1 of the ADV 1 and the CA key 54 normal. The AST relay operates the ST relay through its own make contacts 2 and normal break contacts 3 of the T relay. These contacts partially close the operate path of the DS selector 43 through contacts 3 (FIG. 9), and ground the cycle counter 56 through make contact 4 to complete its operate path so that it scores once. Contacts 2 also ground the TA relay lead through TA make contact 1 to complete the conduction path for transistor Q23 which operates the TA relay in the standard timing circuit 93.

The ST relay (FIG. 12) when operated by the AST relay, opens the original operate path of the AST relay through ST break contacts 1 and locks operated through its own make contacts 2 and normal break contacts 3 of the T relay. The ST relay also transfers the ground operate path of the TA relay from make contact 2 of the AST relay to its own operated make contact 2. This partially closes a path through contacts 3 for the metallic loop of the TA jack 57 and partially closes separate ground operate paths for both the ADV and ADV1 relays through contacts 4 and 5 respectively. Make contacts 6 of the ST relay close the originating line loop (FIG. 8) in the ring lead signaling a request for service to the office.

The TA relay (FIG. 12) when operated also opens the metallic loop path for the TA jack 57 through contacts 2 and closes the operate path for the TA lamp 78 through contacts 1, thereby lighting the lamp. The TA jack 57 can be used to connect the apparatus to an external audible or visual alarm circuit (not shown). The external alarm would then operate when a metallic loop is completed between the tip and sleeve of the jack 57 should the apparatus time out on a trouble condition and block.

As dial tone is received on each line, ground from the office is applied to the sleeve of the line. Ground on the sleeve of the originating line, FIG. 8, completes the operate path for the S1–5 relays in the sleeve control circuit (FIGS. 3 and 8). Operating battery for the S1–5 relays is provided through break contacts 1 of the ADV relay normal.

The S1–5 relays (FIG. 8) when operated complete the ground operate path for lighting the associated LS1–5 lamp through contacts 1 signifying that ground is present on the originating sleeve. Should a loss of sleeve or ground occur, the lamp will extinguish and the apparatus will block, as briefly mentioned in the discussion of the sleeve control circuit of FIG. 3.

In greater detail, contacts 2 on relays S1–5 (FIG. 12) complete the ground operate path for the ADV relay through diode 58 and make contact 4 of the ST relay actuated to operate the ADV relay. Contacts 3 on relays S1–5 (FIG. 12) complete the ground operate path for the ADV1 relay causing it to operate. Contacts 4 of the S relays take control of the operating battery from ADV relay contacts 1.

The ADV relay (FIGS. 3 and 12) when operated opens contact 1 in the original battery operating path of the S1–5 relays (FIG. 8) and transfers the battery to make contacts 4 of the operated S1–5 relays and resistors 59. Contacts 3 of the ADV relay in FIG. 8 prepare a ground operate path for the originating sleeve leads through transistors Q23–29 and Zener diode 33 in order to hold up the switch train should the apparatus block due to loss of sleeve.

In the event of loss of sleeve, the following circuit action takes place. With reference to FIGS. 3 and 8, resistance battery from the office equipment is placed on a sleeve lead. The potential across the 3.9 v. Zener diode 33 due to the presence of the resistance battery is sufficient to cause it to conduct in the inverse direction. The conducting path of the diode 33 is from the battery on the sleeve lead, through the base and emitter of the particular Q29–33 transistor, through the diode 33, make contact 3 of relay ADV operated to ground. With the particular Q29–33 transistor conducting, the associated S1–5 relay releases extinguishing the LS1–5 lamp to indicate a trouble condition and the switch connections are held through the new ground operating path. Continuous monitoring of the sleeve lead and an efficient means of trouble shooting are thereby provided.

Contacts 4 of the ADV relay partially complete the ground path of the DS selector 43 (FIGS. 5 and 9) through a make contact 3 of the AST relay operated and complete the conduction path of transistor Q20 which operates the D.C. relay.

The ADV1 relay (FIG. 12) upon actuation locks to ground through its own make contact 1 under control of the ST relay contacts 5. Contacts 2 of the ADV1 relay complete the ground conduction path of the OLSC originating line sleeve check lamp to light the lamp. The lamp lights and remains lighted when ground is present on all five sleeves of the originating line. To meet this requirement when one of the lines is not being used, the class switch 21 (FIGS. 2 and 8) is placed in the busy position to provide the necessary ground to the line not used. If ground is momentarily lost on any line, the lamp is extinguished and the apparatus blocks. Contacts 5 of the ADV relay transfer the operate path of said relay to a make contact 2 of the ADV1 and contacts 1 release the AST relay by opening its ground operate path. This prepares the AST relay and the CT register 53 for the next cycle of operation.

The number of pulses transmitted by the test apparatus is determined by a setting of the digit selector 14 (FIGS. 5 and 9). In one preferred embodiment of this invention, there are eleven digit switches 38 per test line, two of which A and B are shown for purposes of illustration in FIG. 9. Each switch has eleven positions, one off position and ten positions designated 1 through 0 corresponding to the numbers found on the telephone dial. Test calls are directed to the terminating test line (FIGS. 7 and 11) by setting the office code and line number on the digit switches 38. Should a wrong number be placed on the switches 38 or a wrong connection made for the number chosen, the apparatus will pulse out the number but will block due to improper termination.

FIG. 9 depicts a standard gas-filled digital counting tube 12, the operation of which is well-known, as a means of regulating the outgoing pulses. The counting tube 12 replaces numerous pulse generating and associated relays which have heretofore been used in the bulky, non-portable call originating apparatus of the prior art. The particular tube selected is connected to a common type power supply 94 and has 30 cathodes, subdivided into 10 groups of 3 cathodes called guide 1 pins, guide 2 pins and cathode pins 86. The tube is shown with only 10 outging cathodes for purposes of illustration in FIG. 9, together with its connecting input and output circuits. The internal tube structure involving guide 1 pins and guide 2 pins is not shown or described since it is understood to be a common commercially available construction.

Figure 10:
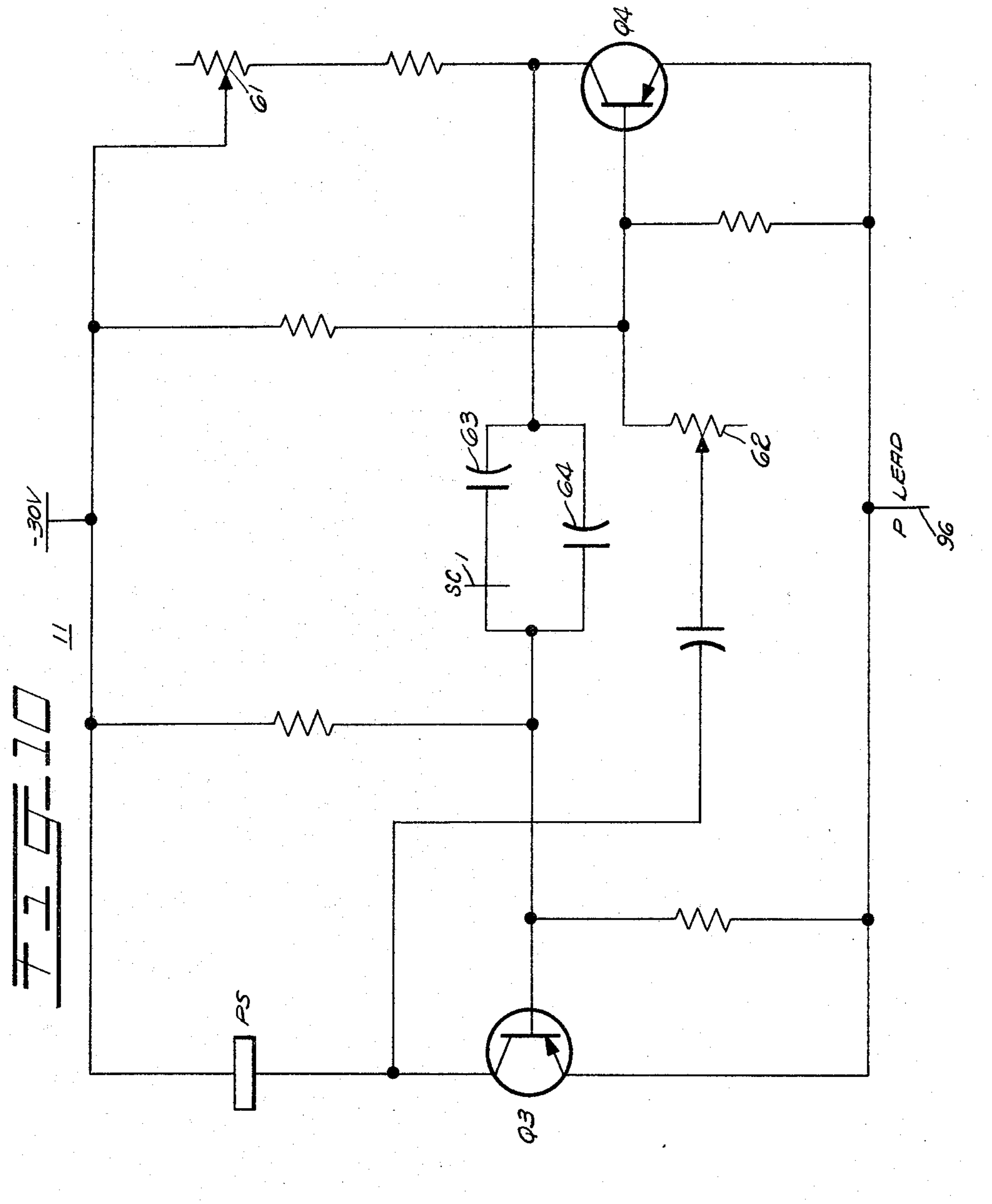

The outpulsing generator 11 for the counting tubes and outgoing circuits comprises a transistorized free running multivibrator illustrated in FIG. 10. The multivibrator comprises two cross-coupled transistors Q3 and Q4. In the cross-coupling network between the base of Q3 and the collector of Q4 is, a break contact 1 of relay SC and a capacitor 63 are connected in parallel with a capacitor 64. In one embodiment, the pulse speed was made variable between 8 to 15 p.p.s. and 18 to 25 p.p.s. Percent break can be adjusted by means of potentiometers 61 and 62. The higher variable pulse speed (primarily for crossbar or panel applications) is obtained by rotating the loop and pulse speed switch 23 of FIGS. 2 and 8 to either of its last two positions which represent 1400 ohm loop or no loop conditions. With the switch 23 in either of these positions, operating ground is supplied to the SC relay. Operation of the SC relay contacts 1 removes capacitor 63 from the parallel combination of capacitors 63 and 64 in the multivibrator circuit effectively doubling the pulse speed output.

Pulsing relay PS in the collector circuit of transistor Q3 will begin to pulse as soon as the transistor is turned on from a ground supplied to the P lead 96 which starts the multivibrator action. The PS relay supplies dialing pulses through a set of break contacts 3 on the ring lead of each originating line as depicted in FIGS. 2 and 8 and supplies counting pulses to the digital counter tube 12 through a set of make contacts 2.

Ground, necessary to trigger the multivibrator action, is supplied over the ST lead 98 (FIG. 12) through make contacts 2 on the S1–5 relays operated, normal break contacts 1 on the RV1–5 relays, make contact 5 of the ADV relay and, finally, through positions 2–12 of the ARC 1 DS selector 43 (FIG. 9). At the same time the switch magnet 97 of the DS selector (FIGS. 5 and 9) is operated from a ground supplied through make contacts 3 of slow release relay AST operated and steps to an outpulsing position. During the slow release of the AST relay, the same ground that operated the DS selector 43 places transistor Q20 (FIG. 9) of the D.C. timing circuit 99 in conduction through contact 4 of the T relay, thereby operating the D.C. relay. The ground connection to the emitter circuit of transistor Q20 is then transferred to make contacts 1 of relay D.C. operated.

Operation of the D.C. relay contacts 2 (FIG. 9) completes the ground operating path for relay G, and the control circuit gate 36 of FIG. 4. The G relay operates a set of make contacts 1 to short out a set of break contacts 3 on the PS relay in the originating line circuits of FIG. 8 to synchronize the pulses on the originating line with the pulses to operate the digital counter tube 12. D.C. contacts 2 partially complete another ground operating path for the G relay for later use while D.C. contacts 3 complete a ground operating path for the AG relay to operate this relay. The G relay opens break contacts 4 which removes negative 100 volt supply from the digital counting tube 12 of FIG. 9. The G gate relay also opens the No. 1 to 9 cathode leads of the digital counting tube 12 through the operation of its own break contact 6 and removes resistor 66 from the parallel RC network in the base of transistor Q20 through G contacts 5 starting the D.C. timing circuit 99. Capacitor 67 will then charge to switch off the transistor Q20 releasing relay D.C. which, in turn, releases the G relay. Charging time for capacitor 67 is variable through adjustment of potentiometer 68.

Operation of the AG relay contacts 1 in FIG. 9 transfers the No. 10 cathode of tube 12 to negative 48 volts to switch off a transistor Q14. The glow on tube 12 transfers from the No. 10 to the No. 1 cathode. Q14 is not brought back into the circuit until this occurs as the AG relay is a slow release relay. Transfer of the glow from cathode No. 10 to No. 1 thus prevents false conduction of the Q14 transistor if the digit to be sent were zero.

The G relay will not release until the PS relay releases opening its ground operating path. This is done to insure that the pulse sending and pulse counting circuits are synchronized. When the G relay releases, it removes the short across break contacts 3 of the PS relay thereby generating pulses on the originating line while the digital counter tube 12 is simultaneously counting the operation of the PS relay. Counting takes place by impressing negative 100 volt pulses on the guides (not shown) of tube 12 for each operation of the PS relay, i.e., if the G relay is released. Starting on the No. 10 cathode, the glow will transfer to the No. 1, 2, 3, 4, etc., cathodes.

In series with each cathode pin 86 are transistors Q5 to Q14. As the tube fires across any cathode, to complete the cathode circuit, a current flow of approximately 0.4 ma. will flow in the cathode circuit and turn on the associated transistor. Potentiometer 69 is used to adjust the bias on transistors Q5 to Q14 to prevent them from operating falsely. The ten collectors 71 of the transistors are multiplied to the digit switches 38 in a straight multiple. The armatures 72 of the first or A digit switches are connected to the DS selector bank 43 Arcs 2 through 6 contacts 2: armatures 73 of the second or B digit switches are connected to the DS selector 43 Arcs 2 through 6 contacts 3, etc. Arcs 2 through 6 are associated with test lines 1 through 5, respectively, while the armature 74 of Arcs 2 through 6 is connected to the base terminals 76 of transistors Q15 to Q19, respectively.

If, for example, while the A digit switch for the first line is set to position 5 and the DS selector 43 is in position 2, the D.C. relay releases operating the G relay. The G relay, of course, functions only if the PS relay is normal, that is, in the correct part of the pulse as explained previously in the discussion of the pulse generating and counting circuit 11 and 12.

The PS relay now generates pulses on the ring lead of the originating line (FIG. 8) and send pulses to the digital counter tube 12. When the fifth pulse is sent, the glow will transfer to the fifth cathode of tube 12. With the operating path for this cathode circuit completed, transistor Q9 turns on and conducts. Conduction of Q9 now completes the operate path of relay DG1 thru the collector 71 of Q9, the digit switch 38, the DS selector 43, emitter to base of transistor Q15, the winding of DG1 relay, the normally closed contact 3 of relay D.C. and 5 of the T relay, and finally through contacts 5 of the ADV and 1 of RV1–5 relays to ground.

Transistor Q15 (Q16–Q19 for other test lines) amplifies the current flow of Q9 to operate the DG1 relay (FIG. 9). DG1 relay operated locks through its own make contacts 1, in series with resistor 77, to negative 48 volts. This locking path also back biases the Q15 transistor to switch it off limiting the outgoing pulses to the predetermined count. A set of make contacts 3 of the DG1 relay operates to short break contacts 3 of the PS relay to eliminate any further pulsing over this line while relay DG1 remains operated.

Similarly, the DG2–5 relays will operate as the digital counter tube 12 fires on cathodes 86 connected through like paths to these relays. All DG1–5 relays operated indicate that all the required pulses have been sent for the A digits of each line. When this occurs, a chain circuit from ground through make contacts 2 of the DG1–5 relays completes a conduction path for transistor Q20 to turn it on. The D.C. relay, associated with interdigital timing, will then operate the DS selector 43 stepping it to the next position. Relay D.C. remains operated during the interdigital time until capacitor 67 is charged.

The operated D.C. relay energizes the G relay which recycles the counting tube 12, as previously explained, and releases the DG1–5 relays. When capacitor 67 charges to switch off transistor Q20 releasing the D.C. relay, the pulsing cycle will repeat for the next digit. The operations described will continue until all digits have been pulsed. At that time, ground from Arc 1 of the DS selector 43 advances the selector to position 22. The test set now waits for termination of the calling lines.

As the calling lines are terminated, ground is received on the terminating line sleeves, FIG. 11. When all terminating line sleeves are grounded, transistor Q21 is turned on and the operate path of the TS relay is completed, ground being supplied over the A lead from position 22 of the DS selector Arc 1 (FIG. 9). Potentimoeter 78 is provided to adjust the bias voltage on transistor Q21 to that value which requires that all five terminating line sleeves be grounded before it can be turnd on.

The TS relay of FIG. 11, contacts 5, operates the RA relay by completing a ground operating path through a make contact 7 of the ST relay operated. Contacts 1, 2 and 3 of the TS relay partially complete the ringing check paths for operation of the TP and TR relays and contacts 4 partially close the operate path for the ADVT relay.

The RA relay of FIG. 11, contacts 2, lights the TL lamp 87 for a visual check of the terminating sleeves, locks operated to ground through make contacts 8 of the ST relay operated and closes the terminating tip and ring contacts 3 and 4 through the ringing switches to the R1–5 relays. The trip switch 46 is previously set to the proper position in order to fulfill the pretrip requirement. Ringing switches 41 must also be set to the required position or the R1–5 relays will not operate blocking the set.

Should the line trip prematurely, the R relay will not operate and the set will block. The R1–5 relays are marginal to insure operation on the proper ringing current only. However, if the proper current is applied, then the R relay (FIG. 11) operates and contacts 1 short out the ringing discriminator circuit comprising a parallel RC combination, i.e., one of resistors 79 and one of capacitors 81, and locks operated through the terminating tip and ring loop by means of contacts 2. If all relays R1–5 have operated, a chain circuit of make contacts 3 from each relay supply operating ground to the TR relay through a make contact 3 of the TS relay operated. On the other hand, if battery reversal occurs, diodes 82 will short out the winding of the R1–5 relays releasing the relays and blocking operation of the set. When all R1–5 relays, contacts 4, have operated, a short across capacitor 83, which is part of a timing circuit 101, is removed.

Relay TR operates upon operation of relays R1–5, but begins to time out immediately to release. The timing out circuit 101 includes capacitor 83 and potentiometer 84. The necessary timing adjustment is made with the potentiometer 84.

When relay TR releases, with the R1–5 relays contacts 5 operated, operating ground is applied to relay TP (FIG. 11). The TP relay operated locks over its own make contact 1 in series with a make contact 1 of the TS relay operated and a normal break contact 1 of the TR relay. Contacts 2 of relay TR short out the pretrip resistors 102 in the terminating line loops. The line then trips, which reverses the battery in the circuit under test to the jack 49, operating relays RV1–5. TP contacts 3 short out break contacts 1 of relays RV1–5 to provide ground on the ST lead 98 through a chain circuit of make contacts 2 of the S1–5 relays operated.

If the TS relay is operated, contacts 4 supply an operating ground to the winding of a slow operate ADVT relay through thermistor 79 and resistor 81. Relays RV1–5 contacts 2 and ADVT contacts 1 operated ground the T lead 103 to operate the T relay of the recycle timer 53. If the repeat key is normal, the set will release since operation of the T relay releases all operated relays and opens all line loops to return the test set to normal. If the repeat key 52 is operated, the set will automatically recycle as previously described.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for testing step-by-step telephone equipment having a plurality of outgoing and terminating lines comprising:
   - pulse generating means connected to said outgoing lines,
   - a counting device connected to the outgoing lines and coupled to the terminating lines, said device being supplied with pulses from said pulse generating means,
   - a control device limiting the output pulses of the counting means in accordance with predetermined digit control settings,
   - switching means actuated by the controlled pulses from the output of the counting means to apply at least one different pulse to each of the outgoing lines, and
   - means connected to the terminating lines for registering the outgoing transmitted pulses and signaling when all the pulses have been received.

2. Apparatus for testing electromechanical switching equipment comprising:
   - a transistorized free running multivibrator,
   - a relay connected therein and pulsed by the multivibrator,
   - a plurality of outgoing lines connected to the multivibrator to transmit the relay pulses,
   - a digital counting tube connected to the outgoing lines and to the multivibrator to receive pulses therefrom,
   - amplifying means serially connected to the output of the counting tube for amplifying the counting pulses,
   - control means connected to said amplifying means to determine the number of pulses counted,
   - switching means actuated by the counting pulses to apply at least one different pulse to each of the outgoing lines,
   - a plurality of terminating lines corresponding to the pulsed outgoing lines connected to the apparatus, and
   - signaling means to indicate when all of the outgoing pulses have been received on the terminating lines.

3. In an apparatus for testing telephone switching equipment by pulsing a simulated call over one or more outgoing lines to terminations at the apparatus, counting means for limiting the outgoing dial encoded pulses to a predetermined count comprising:
   - a digital counting tube having an internal conductive path and a plurality of cathode circuits each corresponding to a particular telephone digit,
   - a biasing source on one of the cathode circuits maintaining the tube in an operative state prior to counting, and
   - means for transferring the conductive path in said counting tube to a cathode circuit corresponding to a first calling digit in order to prevent false firing of the tube if the digit sent were to correspond to the biasing cathode circuit prior to conduction.

4. Apparatus for testing step-by-step telephone switching equipment in central offices having at least one selector frame connected to a plurality of subscriber lines comprising:
   - means for impressing different calling digits on the plurality of subscriber lines comprising,
     - pulse generating means,
     - counting means connected to said pulse generating means for receiving the individual pulses therefrom,
control means actuated by the counting means to limit the outgoing pulses to each of the lines in accordance with a predetermined count representative of a subscriber's number, and
means for shifting counting pulses on lines not connected to a separate selector frame one pulse behind the other outgoing pulses so that each call is directed to a particular selector and no two calls hunt on the same selector.

5. Apparatus for monitoring a circuit condition such as ground on a line comprising:
a source of voltage,
a relay initially operated through a normal ground to battery path,
a circuit path having contacts of said relay leading to battery whereby the serially connected relay locks operated to battery upon actuation thereof,
a transistor shunting the relay and biased to conduct for supplying a new ground path to the line when ground is lost on the relay, and
indicating means to indicate loss of ground.

6. The method of testing step-by-step telephone switching equipment which comprises:
presetting a plurality of sequentially arranged switch means to represent at least one called number,
simulating various subscriber line and office conditions,
producing pulses to simultaneously supply dialing pulses representative of the called numbers to a plurality of outgoing subscriber lines,
counting the supplied pulses,
controlling the pulse feed to the subscriber lines in accordance with a predetermined count set on the switch means,
monitoring the switching equipment for the various preset line and office conditions, and
blocking and holding the switching connections if trouble should occur during a test operation to facilitate location and correction of the trouble.

7. Apparatus for testing telephone switching equipment having a plurality of outgoing and terminating lines comprising:
pulse generating means coupled to the outgoing lines for supplying dialing pulses representative of preselected telephone numbers,
a counter having a first input coupled to the terminating lines and a second input coupled to the pulse generating means to count the dialing pulses and an output coupled to the outgoing lines,
control means limiting the number of output pulses from the counter in accordance with predetermined dialing instructions,
switching means actuated by the controlled pulses from the output of the counting means to apply a plurality of different pulses to each of the outgoing lines simultaneously, and
means connected to the terminating lines for registering the outgoing pulses and signaling the counter when the required pulses have been transmitted.

8. An apparatus for testing telephone exchanges by simulating the dialing of selected subscriber designations comprising:
pulse generator means for producing dialing pulses representative of subscriber designations,
means for controlling the interval between pulses by shorting out the pulse generating means,
a counter connected to the pulse generator for registering the outgoing dialing pulses, and
gating means connected to the counter for preventing the passage of further dialing pulses after a predetermined designation has been dialed.

9. An apparatus for testing telephone central office equipment including a plurality of incoming and outgoing subscriber lines comprising:

pulse generating means coupled to the outgoing lines to transmit dialing pulses representative of subscriber designations over a plurality of outgoing lines simultaneously,
counting means coupled to the pulse generating means for limiting the outgoing pulses on each line to a predetermined count corresponding to a particular subscriber designation, and
means for setting the counting means to limit the outgoing pulses to a different subscriber designation on each subscriber line.

10. An apparatus for testing telephone central office equipment including a plurality of incoming and outgoing subscriber lines comprising:
a multivibrator having a relay connected therein to generate pulses on a plurality of outgoing lines,
a digital counting tube coupled to the multivibrator to receive pulses from the relay connected therein,
amplifying means connected to the counter to amplify the output pulses,
switching means coupled to the counter to permit passage of amplified counting pulses representative of predetermined subscriber designations, and
means for limiting the number of pulses on a particular line in accordance with predetermined instructions.

11. An apparatus in accordance with claim 10 further including:
means for indicating when the plurality of lines under test have successfully terminated, and
means for automatically connecting a second group of lines to the apparatus for testing upon completion of the test on the first plurality of lines.

12. An apparatus in accordance with claim 10 further including:
means for indicating when the plurality of lines under test have been successfully terminated and for returning ground over the terminated lines,
means for checking pretrip conditions on each line,
means for checking ringing conditions on each line, and
means for recycling the test apparatus after successful completion of a call over different outgoing lines by simulating a busy condition on the selected incoming lines.

13. An apparatus for testing telephone switching equipment having a plurality of incoming and outgoing subscriber lines comprising:
a multivibrator having a relay connected therein to generate pulses on a plurality of outgoing lines,
a digital counting tube coupled to the multivibrator and adapted to be pulsed by the relay connected therein, said counting tube including a plurality of outputs each corresponding to a particular dialing number,
a plurality of digit switches coupled to the counting tube outputs, said switches being arranged in groups corresponding in number to the number of lines being simultaneously tested and each switch in a group corresponding to one of the subscriber numerals and being connected to a particular counter output,
a selector switch having a bank of terminals connected to each group of digit switches for advancing the apparatus to test the switching equipment by pulsing a succeeding group of lines upon completion of a prior test,
a transistor coupled between each group of digit switches and a terminal bank on the selector switch, and
relay switching means connected to the transistors and operable upon receiving a counting signal from a transistor to back-bias the transistor, shutting off the particular counting tube output and shunting the multivibrator relay to limit the outgoing pulses.

14. Apparatus for testing telephone switching equipment having a plurality of outgoing subscriber lines, each including voice and supervisory circuit paths, and a plurality of terminating lines for receiving the outgoing calls, and means for impressing one or more different calling digits on one or more outgoing lines simultaneously comprising:

pulse generating means, counting means receiving the individual pulses from the generating means, control means actuated by the counting means to limit the outgoing pulses to each of the subscriber lines in accordance with a predetermined count, means for continuously monitoring the supervisory circuit path for loss of ground comprising:

means for de-energizing the operative connections in the existing supervisory circuit path upon occurrence of fault conditions including failure of battery, reversal of ring and loss of ground, and means for setting various service or office conditions on the outgoing lines comprising:

means for instantaneously supplying a new ground operate path for the supervisory circuit so that the test connections are held for fault correction, and a plurality of adjustable circuit means for setting the class of service and various loop, leak, pulse speed, ringing, and pretrip conditions.

References Cited by the Examiner

UNITED STATES PATENTS

| | | | |
|---|---|---|---|
| 2,680,161 | 6/1954 | Clement | 179—175.2 |
| 2,914,624 | 11/1959 | Murray | 179—175.2 |
| 3,069,512 | 12/1962 | McAllister | 179—175.2 |

KATHLEEN H. CLAFFY, *Primary Examiner.*

ROBERT H. ROSE, *Examiner.*

F. N. CARTEN, *Assistant Examiner.*